United States Patent
Pawar et al.

(10) Patent No.: US 9,179,346 B1
(45) Date of Patent: Nov. 3, 2015

(54) BUSY PERIOD DETERMINATION BASED ON WEIGHTED PERFORMANCE INDICATORS

(71) Applicants: Clearwire IP Holdings LLC, Overland Park, KS (US); Sprint Spectrum L.P., Overland Park, KS (US)

(72) Inventors: Hemanth B. Pawar, Brambleton, VA (US); Shilpa K. Srivinas, Brambleton, VA (US); Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/187,682

(22) Filed: Feb. 24, 2014

(51) Int. Cl.
*H04W 28/00* (2009.01)
*H04W 8/00* (2009.01)
*H04W 16/00* (2009.01)
*H04W 24/08* (2009.01)

(52) U.S. Cl.
CPC ............... *H04W 24/08* (2013.01); *H04W 8/00* (2013.01); *H04W 16/00* (2013.01); *H04W 28/00* (2013.01)

(58) Field of Classification Search
CPC ........ H04W 28/00; H04W 8/00; H04W 16/00
See application file for complete search history.

(56) References Cited

U.S. PATENT DOCUMENTS

| | | | |
|---|---|---|---|
| 8,538,787 B2 | 9/2013 | Braun et al. | |
| 8,565,795 B2 | 10/2013 | Yin et al. | |
| 8,656,224 B2 * | 2/2014 | Duchenay et al. | 714/47.1 |
| 2012/0244859 A1 * | 9/2012 | Jiang | 455/433 |
| 2012/0244869 A1 * | 9/2012 | Song et al. | 455/449 |
| 2013/0324076 A1 | 12/2013 | Harrang | |

FOREIGN PATENT DOCUMENTS

| | | |
|---|---|---|
| WO | 03/055251 | 7/2003 |
| WO | 2012/078110 | 6/2012 |
| WO | 2013/016242 | 1/2013 |
| WO | 2013/016244 | 1/2013 |

\* cited by examiner

*Primary Examiner* — Ayaz Sheikh
*Assistant Examiner* — Debebe Asefa

(57) ABSTRACT

A computing device may obtain n values of a first performance indicator of a network and n values of a second performance indicator of the network. The ith value of the first performance indicator may be based on a measurement of the first performance indicator within an ith time period, and the ith value of the second performance indicator may be based on a measurement of the second performance indicator within the ith time period. A set of aggregate weighted rank values of the first and second performance indicators may be determined. A jth entry in the set of aggregate weighted rank values may be selected, and the jth value of the first performance indicator and the jth value of the second performance indicator may be used to provision the network.

20 Claims, 5 Drawing Sheets

| TIME PERIOD | CHANNEL UTILIZATION | CONNECTED WCDS | RANK OF CHANNEL UTILIZATION | RANK OF CONNECTED WCDS | WEIGHTED RANK |
|---|---|---|---|---|---|
| T1 | 20% | 2 | 2 | 2 | 5 |
| T2 | 60% | <u>100</u> | 3 | 5 | 9.5 |
| T3 | <u>90%</u> | 1 | 5 | 1 | 8.5 |
| T4 | 80% | 70 | 4 | 4 | <u>10</u> |
| T5 | 10% | 3 | 1 | 3 | 4.5 |

| TIME PERIOD | CHANNEL UTILIZATION | CONNECTED WCDS | RANK OF CHANNEL UTILIZATION | RANK OF CONNECTED WCDS | WEIGHTED RANK |
|---|---|---|---|---|---|
| T1 | 20% | 2 | 2 | 2 | 5 |
| T2 | 60% | 100 | 3 | 5 | 9.5 |
| T3 | 90% | 1 | 5 | 1 | 8.5 |
| T4 | 80% | 70 | 4 | 4 | 10 |
| T5 | 10% | 3 | 1 | 3 | 4.5 |

Fig. 4

BUSY PERIOD DETERMINATION BASED ON WEIGHTED PERFORMANCE INDICATORS

BACKGROUND

Wireless networks may provide telephony, packet data, and other services to wireless communication devices (WCDs). For example, a wireless network may include one or more wireless coverage areas through which the WCDs may obtain wireless communication services. Management of these wireless networks may involve taking measurements to determine a typical busy hour of the day, and arranging the wireless network so that it is likely to have sufficient capacity to handle the load of the typical busy hour.

OVERVIEW

As wireless networks have evolved and become more complex, they also are more relied upon than ever for providing nearly-ubiquitous network (e.g., Internet) access to consumers, business users, and the government. When these wireless networks become busy, users may experience dropped connections, slow data rates, outages, and/or other service deficiencies. As a result, the users may become frustrated and potentially seek out a different service provider.

In order to reduce the extent of service deficiencies, wireless network operators may continuously, periodically, and/or from time to time, measure the usage of their wireless networks. If a particular wireless network exhibits a high usage, the wireless network operator may seek to rearrange, adjust, or reconfigure the parameters of the particular wireless network so that this network can better accommodate the load. Alternatively or additionally, the wireless service operator may respond to high usage by adding more capacity to its wireless network.

The usage of wireless networks may be measured using some form of performance indicator, such as radio network utilization, number of users per wireless coverage area, data usage per carrier frequency (tonnage), number of failed calls, number of dropped calls, and so on. While these measurements may be performed throughout a day, the measurements of interest for capacity planning purposes may be those taken when the wireless network is the busiest. For instance, the 60-minute period that exhibits the highest usage in a given epoch (e.g., a day or a week) may be referred to as the "busy hour" of the wireless network. Capacity planning and management decisions for the wireless network may be based on the usage during this busy hour.

Busy hour determinations made based on a single performance indicator may provide a limited view of the overall usage of a wireless network. Therefore, it may be more effective to consider a weighted aggregate value of multiple performance indicator measurements when establishing a busy hour.

Accordingly, in a first example embodiment, n values of a first performance indicator of a network and n values of a second performance indicator of the network may be obtained. The ith value of the first performance indicator may be based on a measurement of the first performance indicator within an ith time period of an epoch. The ith value of the second performance indicator may be based on a measurement of the second performance indicator within the ith time period of the epoch.

A first set of rank values for the n values of the first performance indicator and a second set of rank values for the n values of the second performance indicator may be determined. The ith entry in the first set of rank values may indicate a rank of the ith value of the first performance indicator. The ith entry in the second set of rank values may indicate a rank of the ith value of the second performance indicator. A set of aggregate weighted rank values may also be determined, where the ith entry of set of aggregate weighted rank values may be based on (i) the ith entry of the first set of rank values, (ii) a first performance indicator weight, (iii) the ith entry of the second set of rank values, and (iv) a second performance indicator weight.

Based on one or more comparisons among the aggregate weighted rank values, a jth entry in the set of aggregate weighted rank values may be selected. The RAN may be provisioned based on the jth value of the first performance indicator and the jth value of the second performance indicator.

A second example embodiment may include a non-transitory, computer-readable storage medium, having stored thereon program instructions that, upon execution by a computing device, cause the computing device to perform operations in accordance with the first example embodiment.

A third example embodiment may include a computing device, involving at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the claims.

BRIEF DESCRIPTION OF THE DRAWINGS

FIG. 4 also illustrates various types of busy period calculations, in accordance with an example embodiment.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. EXAMPLE WIRELESS COMMUNICATION SYSTEM

Figure 1:
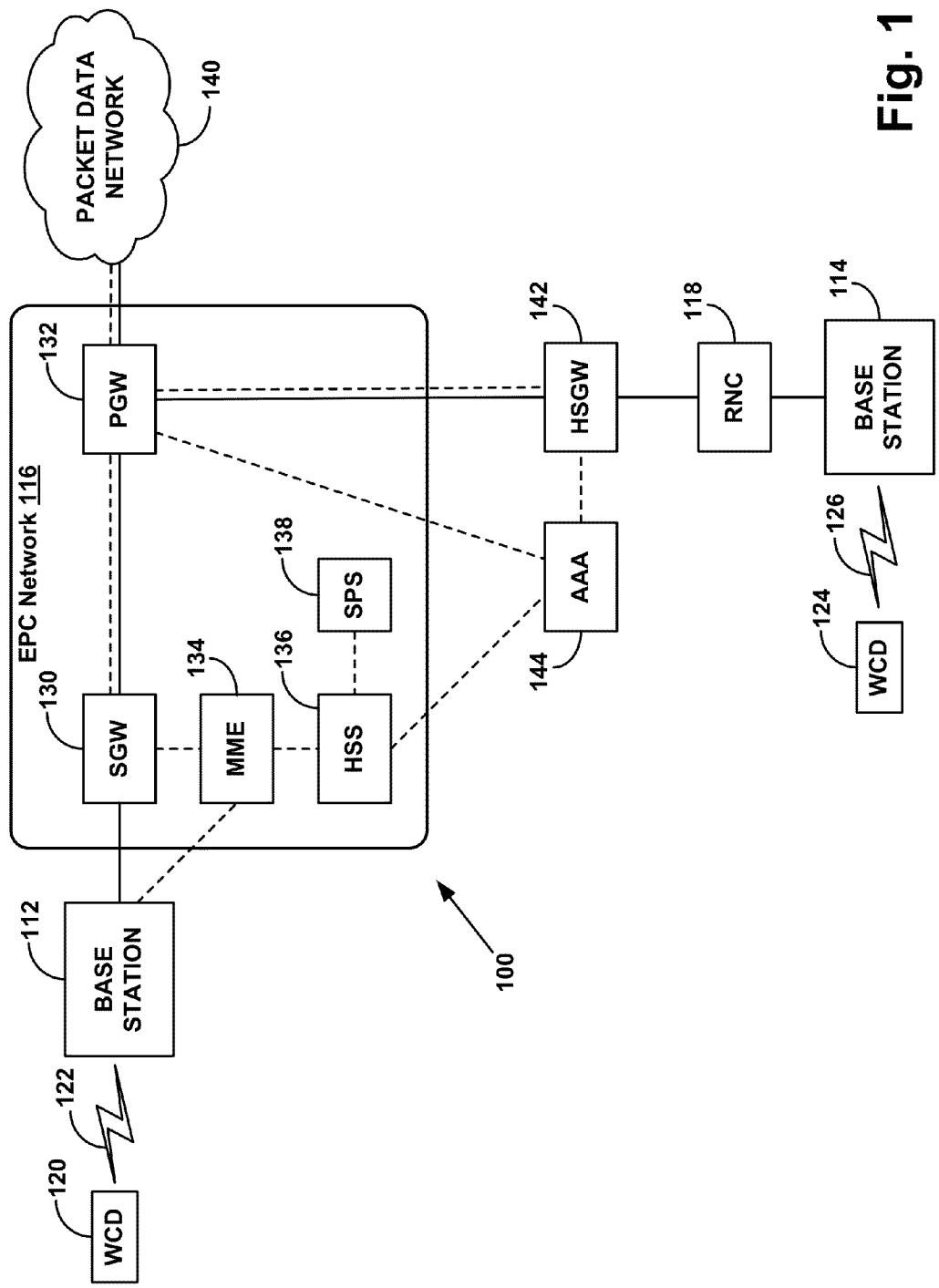
FIG. 1 is a block diagram of a wireless communication system, in accordance with an example embodiment.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved radio access network (RAN) that uses an Evolved Packet Core (EPC) network 116. Base station 114 is part of a legacy RAN that includes a radio network controller (RNC) 118. Base stations 112 and 114 each provide one or more respective wireless coverage areas through which the respective base station can communicate with one or more WCDs. The wireless coverage areas provided by base stations 112 and 114 could be either overlapping or non-overlapping.

These WCDs may also be referred to as user equipment (UE). However, "UE" may be considered a term of art, and WCDs that operate in a partially or fully autonomous manner may be served by wireless communication system 100.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. WCDs 120 and 124 could be wireless telephones, wirelessly-equipped handheld, tablet, or laptop computers, or any other type of WCD. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed, including any code-division multiple access (CDMA), Worldwide Interoperability for Microwave Access (WIMAX), or Wifi protocol.

As an example, in an LTE air interface, data is transmitted on both forward direction and reverse direction channels in the form of orthogonal frequency division multiplexing (OFDM) symbols. Each OFDM symbol may be formed from a plurality of sub-carriers, typically 12 sub-carriers, each with a bandwidth of 15 kHz. A plurality of sub-carriers that are used to form an OFDM symbol may be associated with a duration that can accommodate a particular number of OFDM symbols. This combination of subcarriers and duration may be referred to as a resource block. For instance, WCDs can use the LTE Physical Uplink Shared Channel (PUSCH) to transmit data to a base station. Portions of the PUSCH may be allocated to particular WCDs by allocating resource blocks. In the time domain, each PUSCH resource block typically occupies a 0.5 millisecond slot of time. In the frequency domain, each resource block may occupy a respective portion of frequency bandwidth, typically 180 kHz.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as access subscriber profiles stored in SPS 138. For example, SPS 38 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VoIP), video, streaming media, gaming, and/or other packet data services.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between a legacy RAN, exemplified in FIG. 1 by base station 114 and RNC 118, and EPC network 116. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices.

Those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions. Thus, the particular arrangement shown in FIG. 1 should not be viewed as limiting with respect to the present invention.

2. EXAMPLE COMPUTING DEVICE

Figure 2:
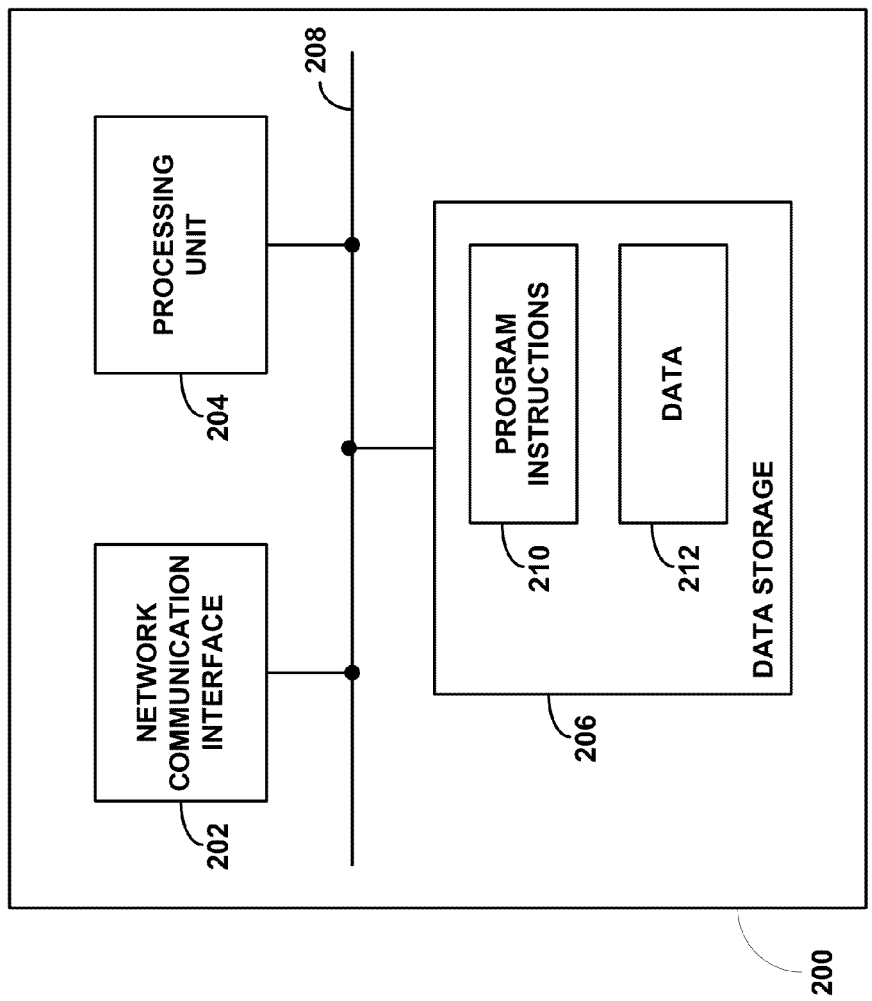
FIG. 2 is a block diagram of a computing device, in accordance with an example embodiment.

FIG. 2 is a block diagram of an example computing device 200. Computing device 200 could be a standalone general purpose or specialized computing device. Alternatively, computing device 200 could be part of the RAN, such as serving gateway (e.g., HSGW 142), packet gateway (e.g., PGW 132), or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 supports communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. EXAMPLE PERFORMANCE INDICATORS

For purposes of illustration, this section describes several examples of performance indicators. In full generality, other types of performance indicators may be used instead of, or in addition to, these performance indicators. Each of these performance indicators relate to an individual wireless coverage area (e.g., one of the wireless coverage areas provided by base stations 112 and 114), but at least some may also relate to more than one wireless coverage area, or to a wireless network as a whole, including RAN components and/or backhaul links.

Forward direction channel utilization may be based on the number of resource blocks on forward direction channels allocated to WCDs that are served by the wireless coverage area. Alternatively, this performance indicator could be expressed as a fraction or percent of the maximum number of resource blocks on forward direction channels of the wireless coverage area.

Reverse direction channel utilization may be based on the number of resource blocks on reverse direction channels allocated to WCDs that are served by the wireless coverage area. Alternatively, this performance indicator could be expressed as a fraction or percent of the maximum number of resource blocks on reverse direction channels of the wireless coverage area.

Forward direction bit rate of a wireless coverage area may be based on the number of bits per second transmitted by the RAN to the WCDs served by the wireless coverage area. Alternatively, this performance indicator could be expressed as a fraction or percent of the maximum forward direction bit rate of the wireless coverage area.

Reverse direction bit rate of a wireless coverage area may be based on the number of bits per second transmitted by the RAN to the WCDs served by the wireless coverage area. Alternatively, this performance indicator could be expressed as a fraction or percent of the maximum reverse direction bit rate of the wireless coverage area.

The forward direction tonnage for a carrier frequency of a wireless coverage area may be based on the number of bits per second transmitted by the RAN to WCDs on this carrier frequency. Alternatively, this performance indicator could be expressed as a fraction or percent of the maximum forward direction bit rate of the carrier frequency.

The reverse direction tonnage for a carrier frequency of a wireless coverage area may be based on the number of bits per second transmitted by WCDs to the RAN on this carrier frequency. Alternatively, this performance indicator could be expressed as a fraction or percent of the maximum reverse direction bit rate of the carrier frequency.

The number of served WCDs may be based on the number of WCDs served by the wireless coverage area. Alternatively, this performance indicator could be expressed as a fraction or percent of the maximum number of WCDs that can be served by the wireless coverage area.

The number of simultaneously connected WCDs may be based on the number of WCDs using traffic channel resources of the wireless coverage area. Alternatively, this performance indicator could be expressed as a fraction or percent of the maximum number of WCDs that can be simultaneously connected in the wireless coverage area.

The connection failure rate of a wireless coverage area may be based on the number of failed attempts to establish a data channel within the wireless coverage area. Alternatively, this performance indicator could be expressed as the number of failed attempts to establish a data channel within the wireless coverage area divided by the total number of attempts to establish a data channel within the wireless coverage area.

The connection drop rate of a wireless coverage area may be based on the number of connections using the wireless coverage area that were abnormally terminated. Alternatively, this performance indicator could be expressed as the number of connections using the wireless coverage area that were abnormally terminated divided by the total number of connections within the wireless coverage area.

4. BUSY PERIOD DETERMINATION

In some cases, capacity planning, provisioning, and other management functions of a network may involve measuring values of a performance indicator of the network throughout the day. The time period over which these measurements are the highest may be referred to as the busy period of the network. As noted above, the 60-minute period that exhibits the highest usage in a given epoch (e.g., a 24-hour epoch, a 168-hour epoch, or some other length epoch), may be referred to as the "busy hour" of the wireless network, and capacity planning and management decisions for the wireless network may be based on the usage during this busy hour.

Busy period determination may be made for an individual wireless coverage area, or for part or all of a particular wireless network. The discussion below focuses on busy period determinations for an individual wireless coverage area (e.g., one of the wireless coverage areas provided by base stations 112 and 114), but the same procedures may apply more than one wireless coverage area or to a wireless network as a whole, including RAN components and/or backhaul links.

For instance, the RAN (or some other entity) may measure the values of a particular performance indicator throughout the day. The busy hour may be determined to be the 60-minute period in which these measurements exhibited the greatest value, the greatest average value, etc. In some cases it may be advantageous to consider a time period of other than an hour. For example, a "busy half hour" period, "busy 15 minute" period, or any other time period may be considered instead of, or in addition to, a busy hour.

Further, a busy hour may be defined to fall "on the hour," e.g., from 1 pm to 2 pm, 2 pm to 3 pm, etc. Alternatively, a busy hour could fall within a staggered hour, e.g., from 1:15 pm to 2:15 pm, 2:15 pm to 3:15 pm, etc. In another alternative, a busy hour could be determined based on a 60-minute sliding window, and therefore could span any 60-minute period of the day.

Figure 3:
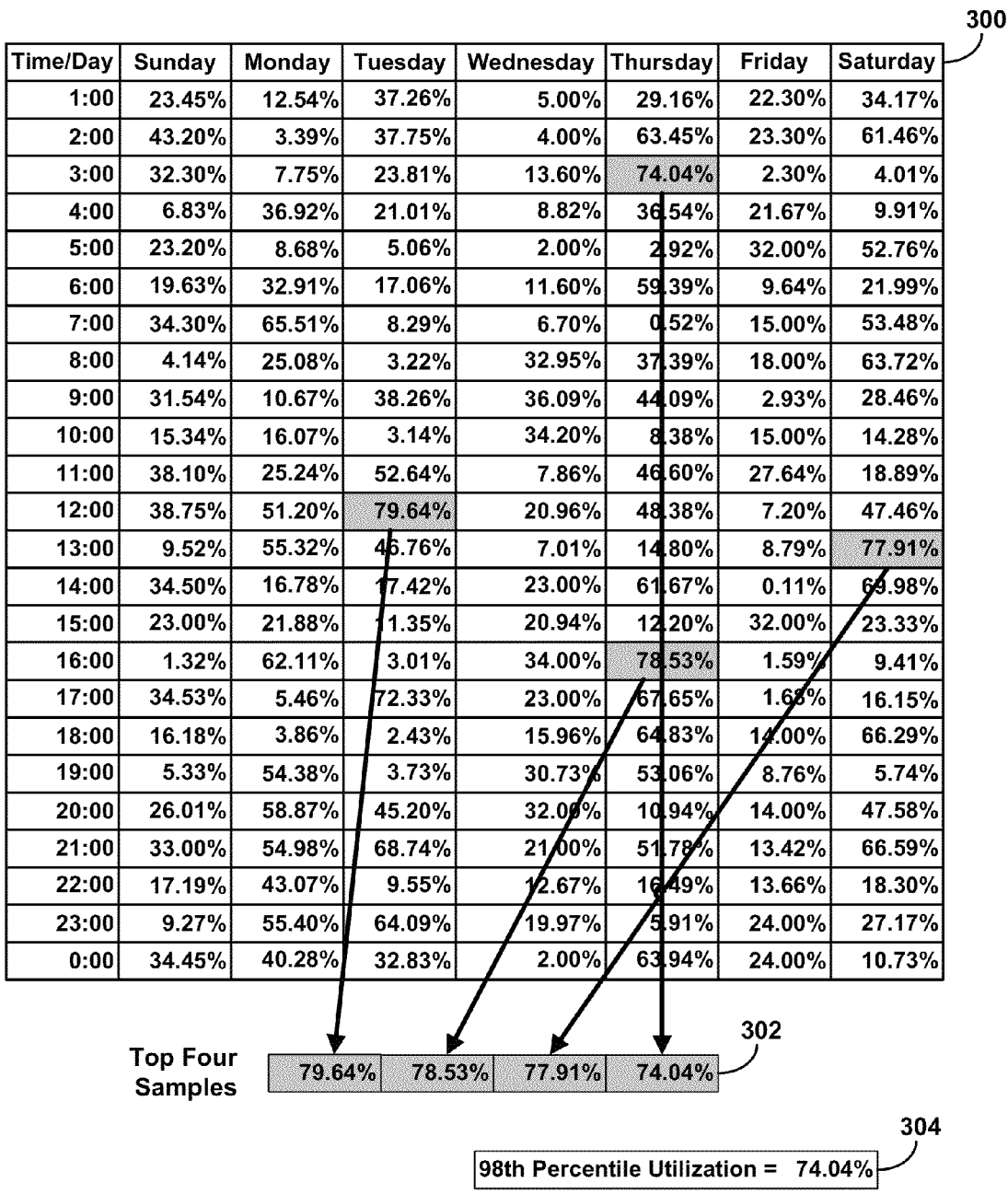
FIG. 3 illustrates various types of busy period calculations, in accordance with an example embodiment.

FIG. 3 depicts an example busy hour determination that considers 24 one-hour time periods over the course of a week. Table 300 provides sampled values of performance indicator measurements for each time period. The performance indicator is represented as a percentage, and therefore may represent a channel utilization percentage, a bit rate percentage, a tonnage percentage, a percentage of served WCDs, a percentage of simultaneously connected WCDs, a connection failure rate percentage, a connection drop rate percentage, or some other type of performance indicator.

In FIG. 3, a "98th percentile rule" is applied. Instead of selecting the sample in Table 300 with the greatest value as a representation of busy hour usage, the sample that represents the 98th percentile of all sampled values is selected. Since there are 168 total entries in Table 300, the fourth highest entry in Table 300 is a reasonable approximation of this 98th percentile. Thus, top 4 samples 302 are selected, and the lowest of these is the 98th percentile. Accordingly, 98th percentile utilization 304 is 74.04%, which corresponds to the sample taken at 3 am Thursday. In this example, capacity planning and management decisions may be made based on the value of 98th percentile utilization 304.

Regardless of methodology, the busy period utilization of wireless networks may be determined using various performance indicators. However, each of these performance indicators may represent a different quality of the network. Therefore, under a particular usage pattern, one performance indicator may indicate a high load, while another performance indicator might indicate a low load.

As an example, consider a wireless coverage area that supports a maximum of 128 served WCDs, as well as a maximum forward-direction bit rate of 4 megabits per second. In one scenario, 112 WCDs are being served by the wireless coverage area, but each WCD is engaged in low bit rate applications (e.g., text messaging, email, etc.), such that the aggregate forward-direction bit rate is 1 megabit per second. Therefore, in this scenario, the WCD utilization is 87.5%, but the forward-direction bit rate utilization is only 25%. Thus, based on which performance indicator is considered, a very different view of wireless coverage area usage may be represented.

In another scenario, two WCDs are being served by the wireless coverage area, but each WCD is engaged in high bit rate applications (e.g., multimedia streaming, file downloads, etc.), such that the aggregate forward-direction bit rate is 3.8 megabits per second. Therefore, in this scenario, the WCD utilization is 1.6%, but the forward-direction bit rate utilization is only 95%. Again, based on which performance indicator is considered, a very different view of wireless coverage area usage may be represented.

Both of these examples may be considered anomalies. In both cases, one performance indicator is high, but another is low. If a wireless service provider makes capacity management and provisioning decisions based on the higher performance indicator, it may adjust or add capacity in situations where the capacity is not warranted, as the usage represented by the high performance indicator may be due to a rare event rather than a regular occurrence. It may not be economically viable for service providers to manage their networks based on such anomalies, as their networks may end up with an excessive amount of unused capacity.

Therefore, in some situations, it may be advantageous to consider more than one performance indicator when making busy period determinations. For instance, two or more performance indicators may be considered, potentially with different weights applied to each. In this way, the wireless service provider might be able to determine the busy period of a wireless coverage area based on a combination of performance indicators. Further, the wireless service provider would also have the ability to set the weights of the performance indicators, and thus control the relative contribution of each performance indicator.

FIG. 4 provides Table 400, which contains illustrative busy period calculations for various performance indicators. Each entry 402, 404, 406, 408, and 410 represents performance indicator measurements made in the respective time periods T1, T2, T3, T4, and T5.

Thus, for instance, in time period T1, channel utilization (which may be forward direction channel utilization, reverse direction channel utilization, or some combination thereof) is 20% while the number of connected WCDs is 2. In time period T2, channel utilization is 60%, while the number of connected WCDs is 100. In time period T3, channel utilization is 90%, while the number of connected WCDs is 1. In time period T4, channel utilization is 80%, while the number of connected WCDs is 70. In time period T5, channel utilization is 10%, while the number of connected WCDs is 3.

If the busy period is determined based solely on channel utilization, time period T3 would be selected, because this time period has the highest channel utilization. However, time period T3 also has the lowest number of connected WCDs. If the busy period is determined based solely on the number of connected WCDs, time period T2 would be selected because this time period has the highest number of connected WCDs. However, time period T2 also has the third highest channel utilization.

Instead of or in addition to these busy period determinations, other busy period determinations may be made based on combinations of performance indicators. In some implementations, the measurements associated with each performance indicator may be rank ordered from lowest to highest as part of making the determination.

As an example, the rank of channel utilization column in Table 400 shows the rank ordering of the channel utilization measurements in that table. Thus, the lowest channel utilization (10% from time period T5) is given a rank of 1, the second lowest channel utilization (20% from time period T1) is given a rank of 2, and so on until the highest channel utilization (90% from time period T3) is given a rank of 5.

As another example, the rank of connected WCDs column in Table 400 shows the rank ordering of the measured numbers of connected WCDs in that table. Thus, the lowest number of connected WCDs (1 from time period T3) is given a rank of 1, the second lowest number of connected WCDs (2 from time period T1) is given a rank of 2, and so on until the highest number of connected WCDs (100 from time period T2) is given a rank of 5.

The weighted rank column of Table 400 represents the sum of weighted values of the representative ranks of channel utilization and ranks of connected WCDs for each time period. In this example, a weight of 1.5 was applied to the ranks of channel utilization, and a weight of 1 was applied to the ranks of connected WCDs, then these weighted values were summed. Thus, for instance, the weighted rank of time period T2 may be calculated as 1.5×3+1×5=9.5. Similar calculations may be performed for the other time periods.

Generally, a weight $w_t$ may be defined for each performance indicator t. The weighted rank of a particular time period s may calculated based on the formula:

$$W_s = \sum_t w_t r_{st}$$

Where $r_{st}$ is the rank of the performance indicator t in time period s.

Once these calculations are complete, the weighted rank column may be used to determine the busy period. Particularly, the time period with the highest weighted rank may be considered the busy period. Alternatively, the m highest busy periods may be considered and one or more of these may be selected as the busy period.

One possible advantage of this methodology is that more than one performance indicator is considered when determining the busy period, which may result in a broader view of the utilization of a wireless coverage area. For instance, if just channel utilization is considered, then time period T3 would be selected as the busy period. However, the high utilization in this time period is due to the activities of a single user, and is likely an anomalous result. If just number of connected WCDs is considered, then time period T2 would be selected as the busy period. However, the 100 connected WCDs in time period T2 is almost 50% greater than that of any other time period, and may also be anomalous.

On the other hand, using the weighted ranks, time period T4 would be selected as the busy period. The channel utilization and number of connected WCDs in time period T4 are both high, indicating that more than one utilization metric indicates high utilization for this time period. Additionally, in this example, the wireless service provider has weighted channel utilization to have 50% more weight than number of connected WCDs, indicating that the relative importance of the two performance indicators.

FIG. 4 and Table 400 illustrate one possible embodiment. Other embodiments may exist, and these embodiments may include a different number of time periods, different combinations of performance indicators, and different weights associated with each performance indicator. Thus, FIG. 4 and Table 400 should be considered illustrative and non-limiting.

5. EXAMPLE OPERATIONS

Figure 5:
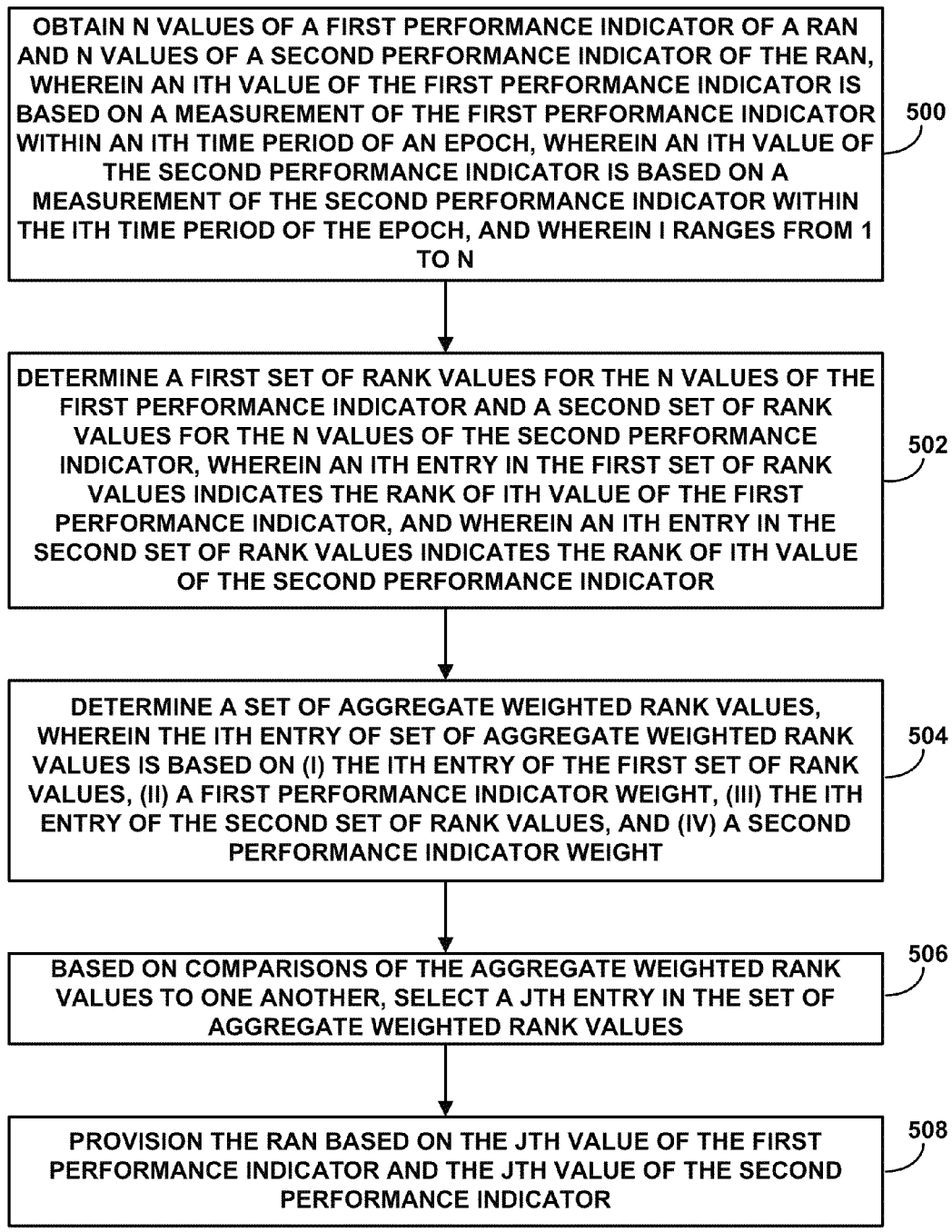
FIG. 5 is a flow chart, in accordance with an example embodiment.

FIG. 5 is a flow chart in accordance with an example embodiment. The operations represented by this flow chart may be carried out by a computing device, such as computing device 200. Although FIG. 5 illustrates operations that may be used to determine a busy period of a RAN, these operations may also be used to determine busy hours of other types of networks or network components.

At block 500, n values of a first performance indicator of a RAN and n values of a second performance indicator of the RAN may be obtained. The ith value of the first performance indicator may be based on a measurement of the first performance indicator within an ith time period of an epoch (e.g., a 24-hour epoch, 168-hour epoch, or some other epoch). The ith value of the second performance indicator may be based on a measurement of the second performance indicator within the ith time period of the epoch. The value of i may range from 1 to n, and the value of n may be greater than 1.

Measuring the first performance indicator within the ith time period of the epoch may involve taking a series of samples of the first performance indicator within the ith time period of the epoch, and obtaining the measurement based on the series of samples (e.g., by averaging or performing some other operation on the series of samples).

At block 502, a first set of rank values for the n values of the first performance indicator and a second set of rank values for the n values of the second performance indicator may be determined. The ith entry in the first set of rank values may indicate a rank of the ith value of the first performance indicator. The ith entry in the second set of rank values may indicate a rank of the ith value of the second performance indicator.

In some embodiments, the rank of the ith value of the first performance indicator may be based on a least-to-greatest ordering of the n values of the first performance indicator. Alternatively or additionally, the rank of the ith value of the second performance indicator may be based on a least-to-greatest ordering of the n values of the second performance indicator.

At block 504, a set of aggregate weighted rank values may be determined. The ith entry of set of aggregate weighted rank values may be based on (i) the ith entry of the first set of rank values, (ii) a first performance indicator weight, (iii) the ith entry of the second set of rank values, and (iv) a second performance indicator weight.

At block 506, possibly based on one or more comparisons of the aggregate weighted rank values to one another, a jth entry in the set of aggregate weighted rank values may be selected. In some embodiments, the jth entry may be greater than or equal to all other entries in the set of aggregate weighted ranks. Further, j may be inclusively between 1 and n.

At block 508, the RAN may be provisioned based on the jth value of the first performance indicator and the jth value of the second performance indicator. In some cases, provisioning of the RAN may be automatically triggered by selecting the jth entry in the set of aggregate weighted rank values. This provisioning may involve adjusting parameters of a wireless coverage area of the RAN based on the jth value of the first performance indicator and the jth value of the second performance indicator.

Alternatively or additionally, the jth value of the first performance indicator and the jth value of the second performance indicator may be associated with a first wireless coverage area. In this case, provisioning the RAN based on the jth value of the first performance indicator and the jth value of the second performance indicator may involve shifting at least some traffic from the first wireless coverage area to a second wireless coverage area. The first wireless coverage area and/or the second wireless coverage may be defined by the RAN.

Also based on the comparisons of the aggregate weighted rank values to one another, a kth entry in the set of aggregate weighted rank values may be selected. The value of k may be different from the value of j, and k may also be inclusively between 1 and n. The RAN may also be provisioned based on the kth value of the first performance indicator and the kth value of the second performance indicator.

A variety of performance indicators may be supported by these procedures. For instance, the first performance indicator may be based on a forward direction channel utilization of a wireless coverage area, or a reverse direction channel utilization of the wireless coverage area. Alternatively, the first performance indicator may be based on a number of served WCDs of a wireless coverage area, or a number of simultaneously connected WCDs of the wireless coverage area. In another alternative, the first performance indicator may be based on a forward direction tonnage of a carrier frequency of a wireless coverage area, or a reverse direction tonnage of the carrier frequency of the wireless coverage area. In yet another alternative, the first performance indicator may be based on a connection failure rate of a wireless coverage area, or a connection drop rate of the wireless coverage area. However, the performance indicators that can be used with the method illustrated by FIG. 5 are not limited to these examples.

6. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
 obtaining n values of a first performance indicator of a radio access network (RAN) and n values of a second performance indicator of the RAN, wherein an ith value of the first performance indicator is based on a measurement of the first performance indicator within an ith time period of an epoch, wherein an ith value of the second performance indicator is based on a measurement of the second performance indicator within the ith time period of the epoch, wherein n is greater than 1, and wherein i ranges from 1 to n;
 determining, by a computing device, a first set of rank values for the n values of the first performance indicator and a second set of rank values for the n values of the second performance indicator, wherein an ith entry in the first set of rank values indicates a rank of the ith value of the first performance indicator, and wherein an ith entry in the second set of rank values indicates a rank of the ith value of the second performance indicator;
 determining, by the computing device, a set of aggregate weighted rank values, wherein the ith entry in the set of aggregate weighted rank values is based on (i) the ith entry of the first set of rank values multiplied by a first performance indicator weight, and (ii) the ith entry of the second set of rank values multiplied by a second performance indicator weight;

based on one or more comparisons among the aggregate weighted rank values, selecting, by the computing device, a jth entry in the set of aggregate weighted rank values; and provisioning the RAN based on the jth value of the first performance indicator and the jth value of the second performance indicator.

2. The method of claim 1, wherein the jth entry is greater than or equal to all other entries in the set of aggregate weighted ranks.

3. The method of claim 1, wherein the rank of the ith value of the first performance indicator is based on a least-to-greatest ordering of the n values of the first performance indicator, and wherein the rank of the ith value of the second performance indicator is based on a least-to-greatest ordering of the n values of the second performance indicator.

4. The method of claim 1, further comprising:

based one or more comparisons among the aggregate weighted rank values, selecting a kth entry in the set of aggregate weighted rank values, wherein k is different from j; and provisioning the RAN also based on the kth value of the first performance indicator and the kth value of the second performance indicator.

5. The method of claim 1, wherein obtaining the measurement of the first performance indicator within the ith time period of the epoch comprises:

taking a series of samples of the first performance indicator within the ith time period of the epoch; and obtaining the measurement based on the series of samples.

6. The method of claim 1, wherein provisioning the RAN based on the jth value of the first performance indicator and the jth value of the second performance indicator comprises adjusting parameters of a wireless coverage area of the RAN based on the jth value of the first performance indicator and the jth value of the second performance indicator.

7. The method of claim 1, wherein provisioning the RAN based on the jth value of the first performance indicator and the jth value of the second performance indicator comprises adding capacity to or removing capacity from the RAN based on the jth value of the first performance indicator and the jth value of the second performance indicator.

8. The method of claim 1, wherein the jth value of the first performance indicator and the jth value of the second performance indicator are associated with a first wireless coverage area, and wherein provisioning the RAN based on the jth value of the first performance indicator and the jth value of the second performance indicator comprises shifting at least some traffic from the first wireless coverage area to a second wireless coverage area.

9. The method of claim 1, wherein the first performance indicator is based on a forward direction channel utilization of a wireless coverage area, or a reverse direction channel utilization of the wireless coverage area.

10. The method of claim 1, wherein the first performance indicator is based on at least one of a number of served WCDs of a wireless coverage area or a number of simultaneously connected WCDs of the wireless coverage area.

11. The method of claim 1, wherein the first performance indicator is based on at least one of a forward direction tonnage of a carrier frequency of a wireless coverage area or a reverse direction tonnage of the carrier frequency of the wireless coverage area.

12. The method of claim 1, wherein the first performance indicator is based on at least one of a connection failure rate of a wireless coverage area or a connection drop rate of the wireless coverage area.

13. The method of claim 1, wherein the provisioning of the RAN is automatically triggered by selecting the jth entry in the set of aggregate weighted rank values.

14. An article of manufacture including a non-transitory computer-readable medium, having stored thereon program instructions that, upon execution by a computing device, cause the computing device to perform operations comprising:

obtaining n values of a first performance indicator of a radio access network (RAN) and n values of a second performance indicator of the RAN, wherein an ith value of the first performance indicator is based on a measurement of the first performance indicator within an ith time period of an epoch, wherein an ith value of the second performance indicator is based on a measurement of the second performance indicator within the ith time period of the epoch, wherein n is greater than 1, and wherein i ranges from 1 to n;

determining a first set of rank values for the n values of the first performance indicator and a second set of rank values for the n values of the second performance indicator, wherein an ith entry in the first set of rank values indicates a rank of the ith value of the first performance indicator, and wherein an ith entry in the second set of rank values indicates a rank of the ith value of the second performance indicator;

determining a set of aggregate weighted rank values, wherein the ith entry in the set of aggregate weighted rank values is based on (i) the ith entry of the first set of rank values multiplied by a first performance indicator weight, and (ii) the ith entry of the second set of rank values multiplied by a second performance indicator weight;

based on one or more comparisons among the aggregate weighted rank values, selecting a jth entry in the set of aggregate weighted rank values; and provisioning the RAN based on the jth value of the first performance indicator and the jth value of the second performance indicator.

15. The article of manufacture of claim 14, wherein the jth entry is greater than or equal to all other entries in the set of aggregate weighted ranks.

16. The article of manufacture of claim 14, wherein the rank of the ith value of the first performance indicator is based on a least-to-greatest ordering of the n values of the first performance indicator, and wherein the rank of the ith value of the second performance indicator is based on a least-to-greatest ordering of the n values of the second performance indicator.

17. The article of manufacture of claim 14, wherein the operations further comprise:

based on one or more the comparisons among the aggregate weighted rank values, selecting a kth entry in the set of aggregate weighted rank values, wherein k is different from j; and provisioning the RAN also based on the kth value of the first performance indicator and the kth value of the second performance indicator.

18. The article of manufacture of claim 14, wherein the measurement of the first performance indicator within the ith time period of the epoch comprises:

taking a series of samples of the first performance indicator within the ith time period of the epoch; and obtaining the measurement based on the series of samples.

19. The article of manufacture of claim 14, wherein provisioning the RAN based on the jth value of the first performance indicator and the jth value of the second performance indicator comprises adjusting parameters of a wireless coverage area of the RAN based on the jth value of the first performance indicator and the jth value of the second performance indicator.

20. A computing device comprising:
at least one processor;
data storage; and
program instructions, stored in the data storage, that upon execution by the at least one processor cause the computing device to perform operations including:
  obtaining n values of a first performance indicator of a radio access network (RAN) and n values of a second performance indicator of the RAN, wherein an ith value of the first performance indicator is based on a measurement of the first performance indicator within an ith time period of an epoch, wherein an ith value of the second performance indicator is based on a measurement of the second performance indicator within the ith time period of the epoch, wherein n is greater than 1, and wherein i ranges from 1 to n;
  determining a first set of rank values for the n values of the first performance indicator and a second set of rank values for the n values of the second performance indicator, wherein an ith entry in the first set of rank values indicates a rank of the ith value of the first performance indicator, and wherein an ith entry in the second set of rank values indicates a rank of the ith value of the second performance indicator;
  determining a set of aggregate weighted rank values, wherein the ith entry in the set of aggregate weighted rank values is based on (i) the ith entry of the first set of rank values multiplied by a first performance indicator weight, and (ii) the ith entry of the second set of rank values multiplied by a second performance indicator weight;
  based on one or more comparisons among the aggregate weighted rank values, selecting a jth entry in the set of aggregate weighted rank values; and
  provisioning the RAN based on the jth value of the first performance indicator and the jth value of the second performance indicator.

* * * * *